United States Patent [19]
Sokai et al.

[11] Patent Number: 4,831,352
[45] Date of Patent: May 16, 1989

[54] RECTIFIER TRANSFORMER

[75] Inventors: Katsuji Sokai; Hiromu Shinkai, both of Ako, Japan

[73] Assignee: Mitsubishi Denki Kabushiki Kaisha, Japan

[21] Appl. No.: 158,734

[22] Filed: Feb. 23, 1988

[30] Foreign Application Priority Data

Mar. 19, 1987 [JP] Japan .................................. 62-62378

[51] Int. Cl.$^4$ ............................................. H01F 33/00
[52] U.S. Cl. ........................................ 336/12; 336/90; 363/5; 363/64
[58] Field of Search .................. 336/5, 10, 12, 90; 363/5, 6, 64

[56] References Cited
U.S. PATENT DOCUMENTS 1,986,604  1/1935  Sabbah .................... 363/64

FOREIGN PATENT DOCUMENTS 61-51409  11/1986  Japan .

*Primary Examiner*—Thomas J. Kozma
*Attorney, Agent, or Firm*—Leydig, Voit & Mayer

[57] ABSTRACT

A rectifier transformer for supplying a predetermined alternating current to a rectifier includes: a transformer having secondary windings (cell windings) connected in a double star in such a manner that common terminal side conductors of the secondary windings are individually drawn out; and an interphase reactor having three iron cores, one of which is provided or each individual phase, primary windings formed by passing the conductors connected to two ends of the individual cell windings through the corresponding iron cores, and secondary windings wound around the corresponding iron cores in such a way that they are inductively coupled to the primary windings, the secondary windings being connected to each other in series so as to form a closed circuit.

6 Claims, 3 Drawing Sheets

RECTIFIER TRANSFORMER

BACKGROUND OF THE INVENTION

The present invention relates to a rectifier transformer, and, more particularly, to an interphase reactor for balancing a load current between two phases during commutation in a double-star-connected rectifier transformer, as well as its connections.

FIG. 1 is a circuit diagram of a rectifier system which incorporates a known double-star-connected rectifier transformer. In the figure, a rectifier transformer 10 has double-star-connected secondary windings which are indicated by u-, v-, and w-phase cell windings 1a, 1b, and 1c, and x-, y-, and z-phase cell windings 1d, 1e, and 1f (a primary winding of the transformer not being shown), respectively. The cell windings 1a, 1b, and 1c have a neutral point terminal $O_1$, and the cell windings 1d, 1e, and 1f have a neutral point terminal $O_2$. The ends of the cell windings 1a 1b, and 1c opposite to the neutral point terminal $O_1$ are connected to the anodes of thyristors 2a, 2b, and 2c, respectively, which act as switching elements of a rectifier 20. The ends of the cell windings 1d, 1e, and 1f opposite to the neutral point terminal $O_2$ are connected to the anodes of thyristors 2d, 2e, and 2f, respectively, of the rectifier 20. An interphase reactor 5 (hereinafter referred to as an "IPR") is connected between the neutral point terminals $O_1$ and $O_2$ for operating the pair of star-connected cell winding assemblies 1a to 1c and 1d to 1f in parallel. The IPR 5 is indicated in the drawing by windings 5a, and has a neutral point O. A load 6 is connected between the neutral point O of the IPR 5 and the cathodes of the thyristors 2a to 2f of the rectifier 20. In practice, the IPR 5 consists of conductors which connect the neutral point terminals $O_1$ and $O_2$ with the load 6 add which are passed through a ring-shaped iron core in a predetermined direction conforming to the direction of flow of current, but description thereof is omitted here. FIG. 2 shows the distribution of current in the rectifier transformer 10 and the IPR 5 in a state wherein a current Iu is passing through the u-phase and a current Iy is passing through the y-phase. In this figure, the parts which correspond to those shown in FIG. 1 are designated by the same reference numerals, and their description is omitted here. The terminals on the neutral point side of the u- to z-phase cell windings 1a to 1f are led to the outside of the transformer 10, and are indicated by Nu, Nv, Nw, Nx, Ny, and Nz, respectively.

The operation of the interphase reactor will now be described. While the cell winding assembly consisting of the u -to w-phase cell windings 1a to 1c and the cell winding assembly consisting of the x- to z-phase cell windings 1d to 1f are operated in parallel, the magnetic flux (not shown) generated in the iron core in the IPR 5 varies so that it generates voltages at the neutral point terminals $O_1$ and $O_2$ in such a way that the voltage generated at the u- to w-phases and the voltage generated at the x- to z-phases are balanced. More specifically, a voltage which corresponds to the difference between the voltage of the u -to to w-phases and that of the x- to z-phases (FIG. 2 indicates the currents flowing i the u- and y-phases) is applied between the neutral point terminals $O_1$ and $O_2$ at the two ends of the IPR 5. With respect to the neutral point O, a voltage which corresponds to half the difference between the voltages of the u- to w-phases and x- to z-phases is applied between the neutral point terminal $O_1$ and the neutral point O and between the neutral point terminal $O_2$ and the neutral point O, respectively. As a result, the potential between the neutral point 0 and the u- to w-phases becomes equivalent to the potential between the neutral point O and the x- to z-phases, so that the pair of three-phase rectifiers can be operated in parallel.

In the known rectifier transformer, in order to connect the IPR (interphase reactor) to the transformer, the neutral point terminals which are individually drawn out from the cell windings are connected to each other at the exterior of the transformer tank to former a common junction, and this common junction is then connected to a conductor of the IPR, as shown in FIG. 2. In this case, however, a copper bar which conducts a large amount of DC current must be handled outside the transformer tank. This makes the connection of the copper bar to the transformer and in turn to the rectifier complicated, and a large amount of space is required. In addition, the IPR may be incorporated inside the transformer tank, but, in such a case, a large amount of space would be needed to form a common junction of the individually extracted neutral points of the cell winding conductors within the transformer tank. This is also very difficult to do because of the induction heating caused by the large amount of current.

SUMMARY OF THE INVENTION

In view of the above-described problems of the prior art, it is an object of this invention to provide a rectifier transformer which can eliminate the need for the connection of an IPR outside the transformer tank, and which ensures an easy connection between the transformer and the IPR.

To this end, the present invention provides a rectifier transformer which comprises a transformer having a secondary winding consisting of a pair of cell winding assemblies, said secondary winding being connected in a double-star in such a manner that common terminal side ends of the secondary winding are individually drawn out; and an interphase reactor having three iron cores one of which is provided for each individual phase, primary windings formed by passing the conductors connected to two ends of the individual cell windings through the corresponding iron cores, and secondary windings wound around corresponding iron cores in such a way that they are inductively coupled to the primary windings respectively, the secondary windings being connected to each other in series, such that currents are balanced between the pair of cell winding assemblies, so that load currents which flow in the pair of cell winding assemblies are balanced.

The IPR according to the present invention has a secondary winding which halves a load current to be supplied to two cell windings in the pair of cell winding assemblies which are the secondary windings of the transformer. In the IPR, the secondary windings are connected in series to form a closed circuit, so that a circulating current flows through the secondary windings to equalize the ampere-turns (AT) generated by the respective primary windings.

DESCRIPTION OF THE PREFERRED EMBODIMENTS

Figure 1:
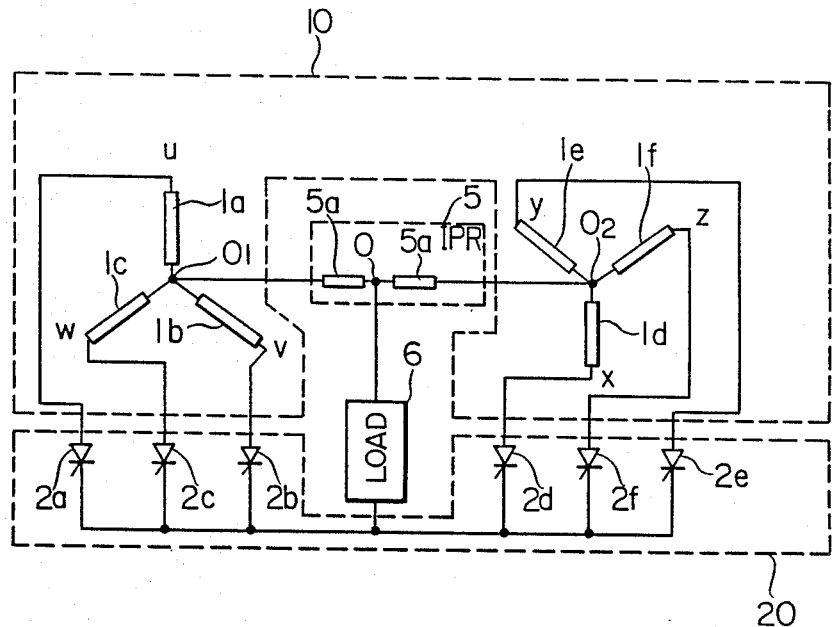
FIG. 1 is a diagram of a rectifier system which incorporates a known rectifier transformer.
Figure 2:
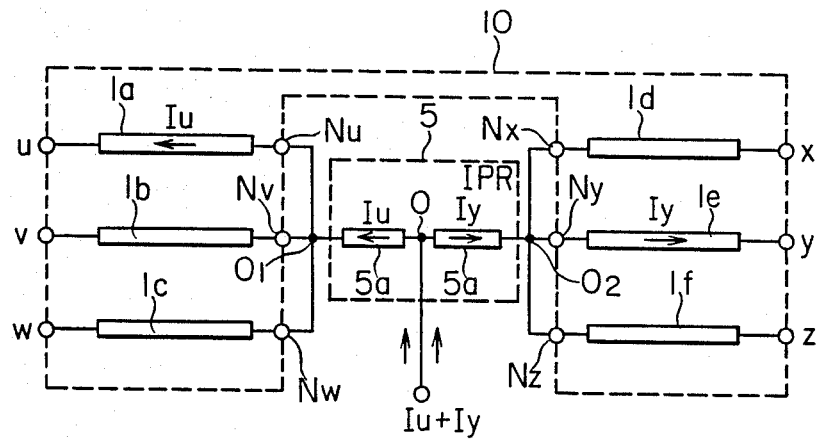
FIG. 2 shows the distribution of current in an interphase reactor and the rectifier transformer of FIG. 1.
Figure 3:
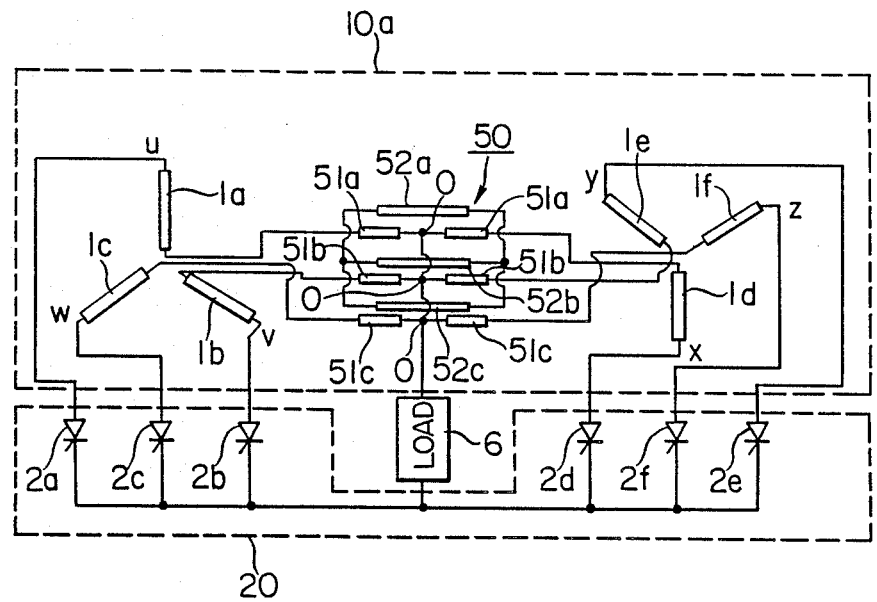
FIG. 3 is a diagram circuit of a rectifier system which incorporates an embodiment of a rectifier transformer according to the present invention.
Figure 4:
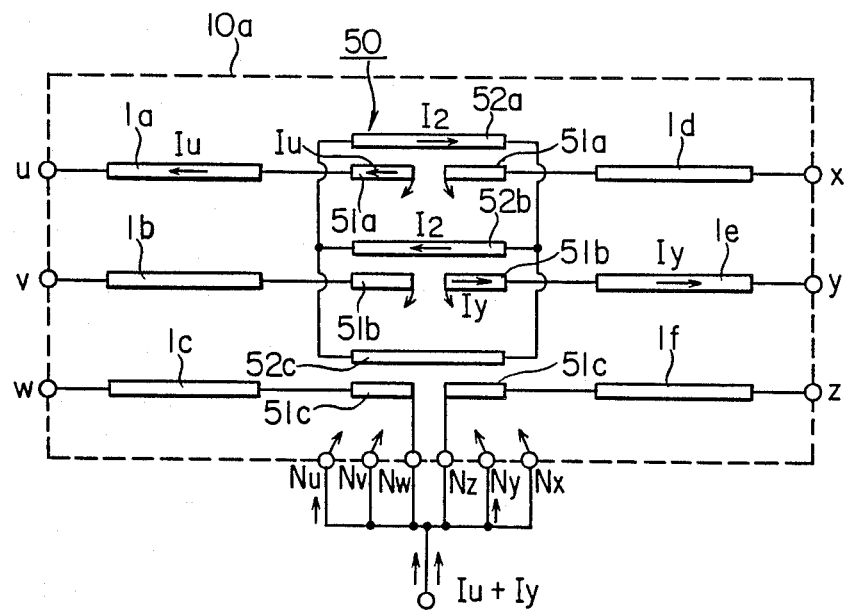
FIG. 4 shows the distribution of current in the rectifier transformer shown in FIG. 3 which incorporates an interphase reactor.
Figure 5:
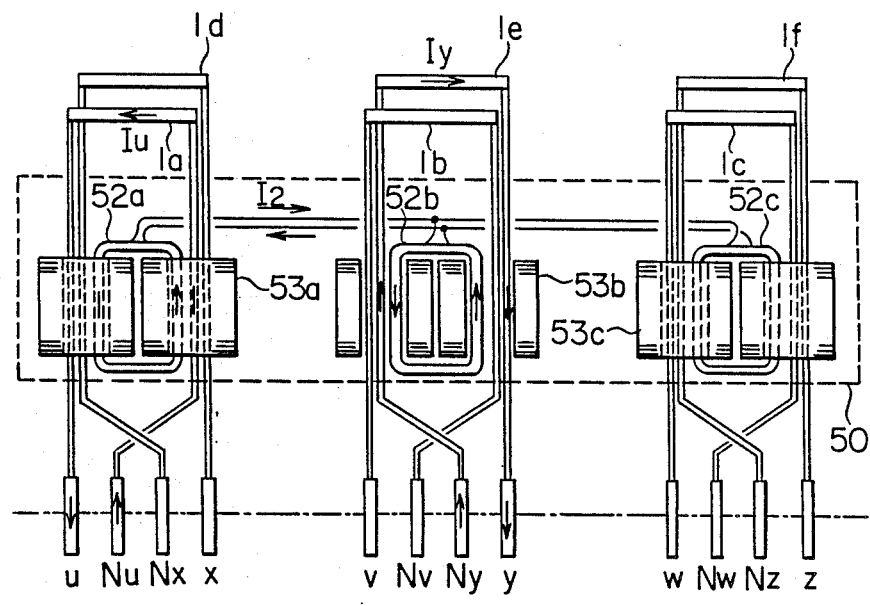
FIG. 5 shows the structure of the interphase reactor according to the present invention.

An embodiment of the present invention will be described below with reference to the accompanying drawings. FIG. 3 is a circuit diagram of a rectifier system which incorporates a rectifier transformer according to the present invention. It is to be noted that in the following description, a rectifier transformer 10a is defined as one which incorporates an interphase reactor 50 (hereinafter referred to as an IPR), and a portion of the rectifier transformer 10a which excludes the interphase reactor 50 is called a transformer. The rectifier transformer 10a has secondary windings (the first windings of rectifier transformer 10a not shown here) which consist of u-, v-, and w-phase cell windings 1a, 1b, and 1c, and x-, y-, and z-phase cell windings 1d, 1e, and 1f, the cell windings 1a to 1c and 1d to 1f being respectively Y-connected without forming a neutral point. The rectifier transformer 10a also incorporates the IPR 50. The IPR 50 has primary windings 51a, 51b, 51c and secondary windings 52a, 52b, and 52c which correspond to the primary windings 51a, 51b, 51c, respectively (the practical structure of the IPR 50 being shown in FIG. 5). The primary windings 51a, 51b, and 51c mare connected between the neutral point side ends of the cell windings 1a and 1d, between the neutral point side ends of the cell windings 1b and 1e, and between the neutral point side ends of the cell windings 1c and 1f, respectively. Each pair of primary windings 51a, 51b, and 51c has a neutral point O. These neutral points O of the primary windings are connected to each other to form a common junction. The secondary windings 52a, 52b, and 52c are inductively coupled to the first windings 51a, 51b, and 51c, respectively, and are connected in series so as to form closed circuits respectively. A rectifier 20 is of the same type as shown in FIG. 1. A load 6 is connected between the cathodes of thyristors 2a to 2f and the common neutral point O of the IPR 50. FIG. 4 shows the distribution of current in the rectifier transformer 10a which incorporates the IPR 50, in a state wherein currents Iu and Iy are passing through the u-phase and y-phase, respectively. In FIG. 4, the parts which correspond to those in FIG. 3 are designated by the same reference current which flows in the circuit formed by the secondary windings 52a and 52b of the IPR 50. FIG. 5 shows the structure of the IPR 50. In practice, each of the primary windings 51a, 51b, or 51c in the IPR 50 (see FIGS. 3, 4) consist of a pair of conductors which are connected to both ends of one of the cell windings 1a to 1f respectively shown in FIG. 5 and the pair of conductors is passed through corresponding iron cores 53a, 53b, or 53c twice in the opposite direction, respectively. The secondary windings 52a to 52c are respectively wound around the iron cores 53a, 53b, and 53c, and are connected to each other in series so as to form a closed circuit.

Figure 6:
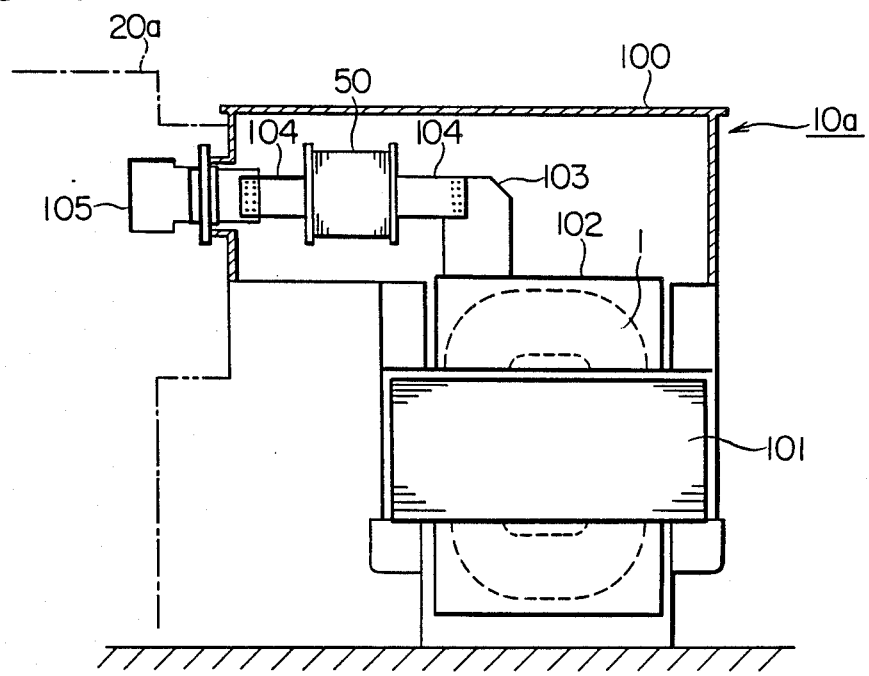
FIG. 6 shows the entire structure of the rectifier system which incorporates the rectifier transformer of the present invention.

The operation of the IPR will be described below. When a current is commutated from the u-phase to the y-phase, the total load current flows through the primary windings 51a and 51b for the u- and y-phases in the IPR 50, as shown in FIG. 4. This causes a circulating current I2 to flow through the secondary windings 52a and 52b for the u- and y-phases in the IPR 50, the magnitude of the circulating current corresponding to the ampere-turns (AT) of the primary windings 51a and 51b. If the u-phase load current in the IPR 50 is increased to more than that of the y-phase, the current which flows through the u-phase secondary winding 52a of the IPR 50 also increases in accordance with its ampere-turns. However, the u-phase secondary winding 52a is connected in series with the y-phase secondary winding 52b in such a way that they form a closed circuit. Therefore, the increased magnitude of current which is flowing through the u-phase secondary winding 52a also flows into the y-phase secondary winding 52b, increasing in turn the magnitude of the primary current which is to flow through the y-phase primary winding 51b, i.e., the load current which is to flow into the y-phase primary winding 51b. This is equivalent to reducing the load current for the u-phase, and results in a flow of half the total load current through each of the u- and y-phases. FIG. 6 shows the entire structure of a rectifier system which incorporates the rectifier transformer according to the present invention. The rectifier system includes the rectifier transformer 10a, a transformer tank 100, a coil 1 consisting of a primary winding (a line winding) and a secondary winding (a cell winding), an iron core 101 around which the coil 1 is wound, an insulating washer 102 for shielding the magnetic fields leaking from the surfaces of the windings, a copper bar 103, connecting copper strips 104, the IPR 50, an epoxy copper plate terminal 105, a rectifier casing 20a indicated by dot-dashed lines and a rectifier (not shown).

In the embodiment shown in FIG. 5, each phase of tee IPR has its own iron core 53a, 53b, or 53c. However, a common iron core may be employed in place of iron cores 53a to 53c, in order to reduce the size of the IPR. In the above-described embodiment, the IPR is incorporated in the transformer tank. However, it may also be provided outside the transformer tank with the same effect, in the same way as in the prior art.

As can be understood from the foregoing description, in the rectifier transformer according to the present invention, connection of the neutral points of the double star connection is not needed, owing to the distribution effect provided secondary windings of the IPR. Therefore, there is no need to handle a large current bus bar, unlike with the three-phase connection of the prior art, and the three phases are connected to a small current bar. In consequence, the circuit configuration of the rectifier system comprising the rectifier transformer and the rectifier can be simplified. In addition, the incorporation of the IPR in the rectifier transformer enables the size of the rectifier device to be reduced.

What is claimed is:

1. A rectifier transformer for supplying a predetermined alternating current to a rectifier, comprising:
   a transformer having primary windings, and secondary cell windings connected in a double star in star in such a manner that common terminal side conductors of said secondary windings are individually drawn out; and an interphase reactor having three iron cores, one of which is provided for each individual phase, primary windings formed by passing the conductors connected to two ends of said individual cell windings through the corresponding iron cores, and secondary windings wound around the corresponding iron cores in such a way that they are inductively coupled to said primary windings, said secondary windings being connected to each other in series so as to form a closed circuit.

2. A rectifier transformer according to claim 1, wherein said interphase reactor is incorporated in a transformer tank which contains said transformer.

3. A rectifier transformer according to claim 1, wherein said interphase reactor is provided outside said transformer tank which contains said transformer.

4. A rectifier transformer according to claim 1, wherein said three iron cores of said interphase reactor are formed as a common iron core.

5. A rectifier transformer according to claim 4, wherein said interphase reactor is provided within said transformer tank which contains said transformer.

6. A rectifier transformer according to claim 4, wherein said interphase reactor is provided outside said transformer tank which contains said transformer.

* * * * *